US007209815B2

(12) United States Patent
Grier et al.

(10) Patent No.: US 7,209,815 B2
(45) Date of Patent: Apr. 24, 2007

(54) TEST PROCEDURES USING PICTURES

(75) Inventors: Jeff Grier, Royal Oak, MI (US); Jim J. Cancilla, San Jose, CA (US); Sunil Reddy, Corpus Christi, TX (US); Dale Trsar, Mount Prospect, IL (US); Vaclav Hoffmeister, San Jose, CA (US)

(73) Assignee: Snap-On Incorporated, Kenosha, WI (US)

( * ) Notice: Subject to any disclaimer, the term of this patent is extended or adjusted under 35 U.S.C. 154(b) by 0 days.

(21) Appl. No.: 11/024,241

(22) Filed: Dec. 28, 2004

(65) Prior Publication Data

US 2006/0142909 A1 Jun. 29, 2006

(51) Int. Cl.
*G06F 19/00* (2006.01)

(52) U.S. Cl. ........................... 701/29; 382/305; 707/3; 340/438

(58) Field of Classification Search ............ 701/32–33, 701/29; 345/856; 717/137–144; 382/305; 707/3; 340/438; *G01M 17/00, 17/07; G06F 17/40; F02P 17/08*
See application file for complete search history.

(56) References Cited

U.S. PATENT DOCUMENTS

| | | | | |
|---|---|---|---|---|
| 4,418,338 | A | 11/1983 | Burt | 340/578 |
| 4,418,388 | A | 11/1983 | Allgor et al. | 364/431.1 |
| 4,658,370 | A | 4/1987 | Erman et al. | 364/513 |
| 4,796,206 | A | 1/1989 | Boscove et al. | 364/551.01 |
| 5,113,496 | A * | 5/1992 | McCalley et al. | 710/305 |
| 5,250,935 | A | 10/1993 | Jonker et al. | 345/134 |
| H1273 | H | 1/1994 | Novick | 434/224 |
| 5,337,320 | A | 8/1994 | Kung | 371/15.1 |
| 5,442,549 | A | 8/1995 | Larson | 364/424.01 |
| 5,533,093 | A | 7/1996 | Horton et al. | 379/21 |
| 5,633,197 | A | 5/1997 | Lur et al. | 438/668 |
| 5,684,999 | A * | 11/1997 | Okamoto | 704/9 |
| 5,835,871 | A | 11/1998 | Smith et al. | 701/29 |
| 5,851,117 | A | 12/1998 | Alsheimer et al. | 434/219 |
| 5,948,038 | A * | 9/1999 | Daly et al. | 701/117 |
| 6,141,608 | A | 10/2000 | Rother | 701/33 |
| 6,758,540 | B1 * | 7/2004 | Adolph et al. | 375/240.26 |
| 6,847,334 | B2 * | 1/2005 | Hayhurst et al. | 345/1.2 |

(Continued)

FOREIGN PATENT DOCUMENTS

DE 1065603 A * 9/2004

(Continued)

OTHER PUBLICATIONS

A well-known Internet Web site: http://www.amazon.com/having some pending claimed features.*

(Continued)

*Primary Examiner*—Cuong Nguyen
(74) *Attorney, Agent, or Firm*—McDonnell Boehnen Hulbert & Berghoff LLP

(57) ABSTRACT

A method for test procedures using pictures for a vehicle diagnostic system that includes providing text items, examining text items, accessing a database of picture items corresponding to text items, correlating picture items with at least a portion of the text items, replacing the at least a portion of the text items with the corresponding picture items, and displaying an image including at least one picture item.

20 Claims, 6 Drawing Sheets

U.S. PATENT DOCUMENTS

| | | | | |
|---|---|---|---|---|
| 6,845,307 | B2 | 1/2006 | Rother | |
| 2001/0003826 | A1 * | 6/2001 | Iwata | 709/206 |
| 2003/0020759 | A1 * | 1/2003 | Cancilla et al. | 345/810 |
| 2004/0148591 | A1 * | 7/2004 | Kumhyr et al. | 717/137 |
| 2005/0021294 | A1 * | 1/2005 | Trsar et al. | 702/183 |
| 2005/0021346 | A1 * | 1/2005 | Nadan et al. | 705/1 |
| 2005/0273229 | A1 * | 12/2005 | Steinmeier et al. | 701/29 |
| 2006/0025907 | A9 | 2/2006 | Kapolka et al. | |

FOREIGN PATENT DOCUMENTS

| | | | |
|---|---|---|---|
| EP | 1065603 | A2 | 1/2001 |
| EP | WO 2004074949 | A * | 1/2001 |
| EP | 991 0 8097.9 | | 4/2002 |
| WO | WO 03/58678 | A2 | 7/2003 |
| WO | WO 2004/074949 | A1 | 9/2004 |

OTHER PUBLICATIONS

East 1.1 Enhancements from Search and Information Resources Administration, published on Jul. 2000-(only provided related pages).*

Rohini K. Srihari, Use of multimedia input in automated image annotation and content-based retrieval, Storage & Retrieveal for Image & Video databases III conference in San Jose, CA, Proceedings of SPIE—The International Society for Optical Engineers, pp. 249-260, published in 1995..*

Eri Akinaga et al., Study on the urban activities appearing in the Internet; Part 2. The correspondence with city indes and the classification of picture images, Symposium on Computer Technology of Information, Systems and Applications, 2003, vol. 26 pp. 61-66.*

Sato Hitomi et al., Study on matching homepage designs and words which express impressions, published in 1999, vol. 99, No. 23 (AVM-24), pp. 31-37, From Dialog® File 94, acc. No. 04096355.*

Rohini K. Srihari, Use of multimedia input in automated image annotation and content-based retrieval, Storage & Retrieveal for Image & Video databases III conference in San Jose, CA, Proceedings of SPIE—The International Society for Optical Engineers, pp. 249-260, published in 1995..*

Eri Akinaga et al., Study on the urban activities appearing in the Internet: Part 2. The correspondence with city indes and the classification of picture images, Symposium on Computer Technology of Information, Systems and Applications, 2003, vol. 26 pp. 61-66.*

Sato Hitomi et al., Study of matching homepage designs and words which express impressions, published in 1999, vol. 99, No. 23 (AVM-24), pp. 31-37, From Dialog® File 94, acc. No. 04096355.*

Adams et al., Automating image matching, cataloging, and analysis for photo identification research, Aquatic Mammals, 2006, vol. 32, issue 3, p. 374 (10 pages).*

Tang et al., Direct: a decentralized image retrieval system fo the national STEM digital library, Information Technology and Libraries, Mar. 2004, vol. 23, issue 1, p. 9 (7 pages).*

Tseng, Automatic cataloguing and searching for retrospective data by use of OCR text, Journal of the American Society for Information Science and Technology, Hoboken, Mar. 2001, vol. 52, issue 5, p. 378.*

F. Dubois et al., An agen-based architecture for content-based multimedia browsing, Intelligent Multimedia Information Retrieval, AAAI Pres/MIT Press, 1997.*

C. Meghini, An image retrieval model based on classical logic, In proceedings of the 18th Annual International ACM SIGIR Conference on Research and Development in Information Retrieval, pp. 300-309, ACM 1995.*

Rohini K. Srihari et al., A model for multimodal information retrieval, Multimedia and Expo, 2000, IEEE International Conference on ICME 2000, vol. 2, Jul. 30-Aug. 2, 2000, pp. 701-704, Digital Object Identifier, posted on Aug. 6, 2000.*

Blue, R.S., et al, "An Automated Approach and Virtual Environment for Generating Maintenance Instructions", CHI 2002 Conf., Conf. on Human Factors in Computing Systems, Minneapolis, MN, Apr. 20-25, 2002, CHI Conf. Human Factors in Computing Systems, New York, NY:ACM, US, Apr. 20, 2002, pp. 494-495.

International Search Report from International Application No. PCT/US2005/046509, filed Dec. 20, 2005.

International Search Report from International Application No. PCT/US2005/046510, filed Dec. 20, 2005.

* cited by examiner

TEST PROCEDURES USING PICTURES

FIELD OF INVENTION

This application relates to test procedures for vehicle diagnostic systems. More specifically, it relates to a system for replacing textual test procedures with pictures to be implemented in a diagnostics system in the automotive industry.

BACKGROUND OF THE INVENTION

A number of different types of diagnostic tools have been used to assist in diagnosis and repair of fault conditions in automotive vehicles. Such tools can typically be connected to an on-board computer of a vehicle in order to download and analyze vehicle operational information from the on-board computer. Additionally, such diagnostic tools typically allow a user to review and/or enter information, including fault symptoms, into the diagnostic tool to be used instead of, or in conjunction with, the information downloaded from the vehicle's on-board computer to diagnose and assist in the repair of fault conditions in the vehicle.

Automotive vehicles are becoming highly computerized products. Consequently, automotive mechanics are increasingly relying upon computerized diagnosis of vehicle operational information that can be accessed via a vehicle on-board computer to diagnose and repair vehicle faults. Additionally, to conduct a computerized diagnosis, an automotive mechanic must review much text to diagnose faults and then solve these faults. Moreover, today's automotive mechanics rely heavily on the computerized diagnosis instructions and information, and less on their own knowledge of a certain automobile.

Since today's diagnosis products provide guidance in text only, it may be difficult to understand or translate into other languages during the diagnostic procedure. Thus, such products are inherently limited because they are prone to incorrect interpretations and mistakes. Jargon and regional slang exacerbate this problem. A considerable amount of time and expense is required to import, format, maintain, and translate diagnostic procedures. Thus, there is a need to simplify many of the diagnostic questions and instructions for service technicians by replacing some or all of the text regarding components involved in diagnostic procedures with pictures, sounds, symbols, colors, or other graphics.

Therefore, a diagnostic tool with the ability to provide instructions or other text in the form of pictures would be desirable.

SUMMARY OF THE INVENTION

The present application relates to a method for diagnosing a vehicle using pictures, the method comprising providing text items, examining text items, accessing a database of picture items corresponding to text items, correlating picture items with at least a portion of the text items, replacing the at least a portion of the text items with the corresponding picture items, and displaying an image including at least one picture item.

DETAILED DESCRIPTION

Vehicle Diagnostic System Architecture

Computerized diagnostic systems are becoming pervasive in several industries. This is especially true of the automotive industry, in which computers are increasingly relied upon for the running, maintenance, and repair of motor vehicles. Computerized diagnostic systems rely upon external and internal computers to assist technicians in diagnosing problems with vehicles, as such systems receive, analyze, and provide data feedback to and from computers in vehicles to better diagnose problems.

Figure 1:
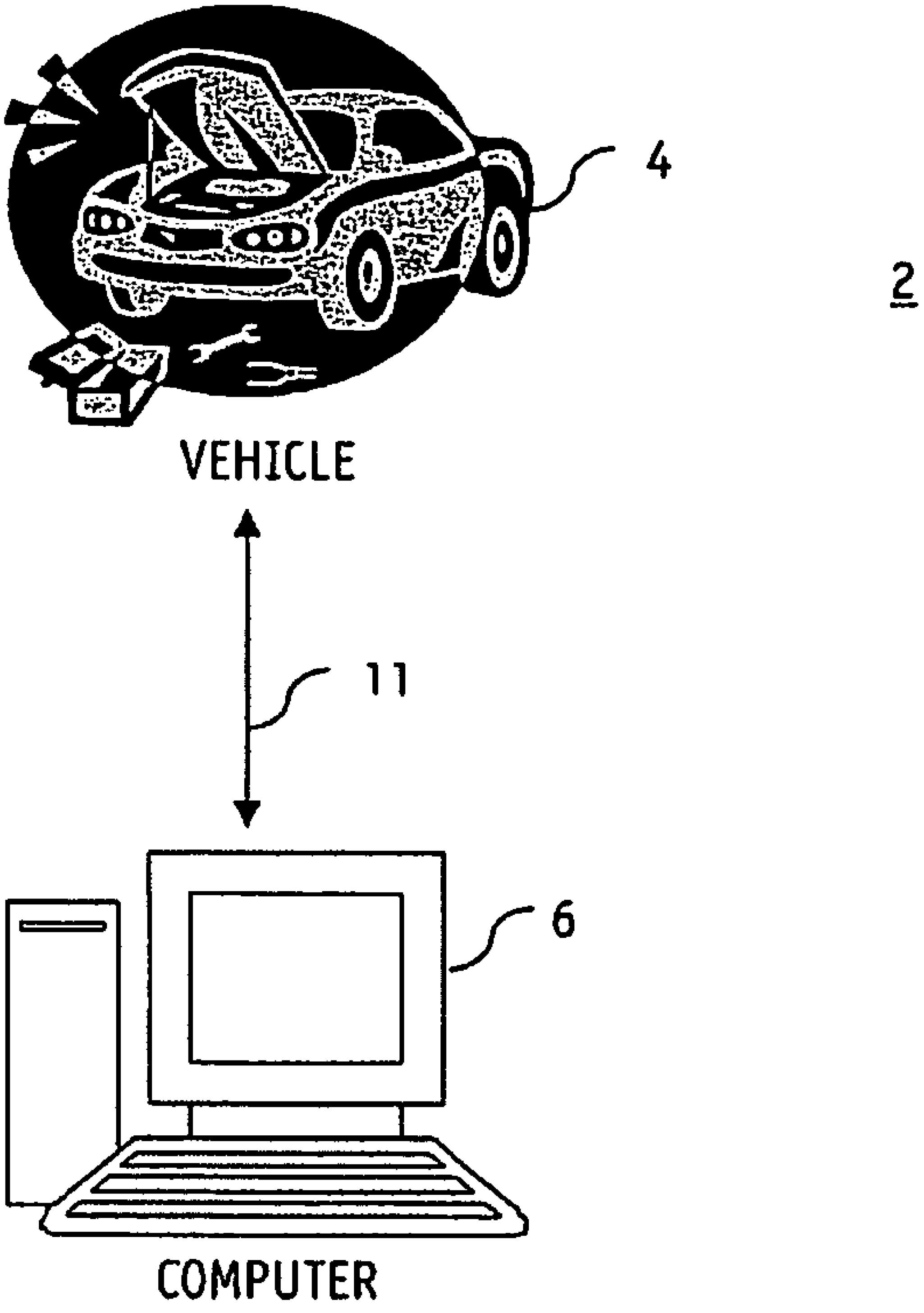
FIG. 1 is a block diagram illustrating communication between a vehicle and a computer in a diagnostic system.

FIG. 1 illustrates an exemplary two-way communication used in a computerized vehicle diagnostic system 2 between an apparatus, such as a vehicle 4, and a computer 6. Such a vehicle diagnostic system 2 may communicate with vehicles to receive information and to diagnose faults based on the vehicle's make and model. Vehicle analyzer hardware 11 translates the data from the vehicle 4 and mediates this communication. Alternatively, vehicle analyzer hardware 11 may be directly incorporated into the computer 6 or a computer located in the vehicle 4, so that the vehicle 4 may directly communicate with the computer 6. In this diagnostic system 2, information from internal computers of the vehicle 4 may be transmitted through vehicle analyzer hardware 11 and compared to stored information in the computer 6, which may be a personal computer, a laptop, a handheld, or other computing device. This communication may be achieved by utilizing infrared, wireless, hard-wired, or other communication methods. Such a diagnostic system helps technicians assess the source and cause of vehicle fault conditions and mechanical problems.

Figure 2:
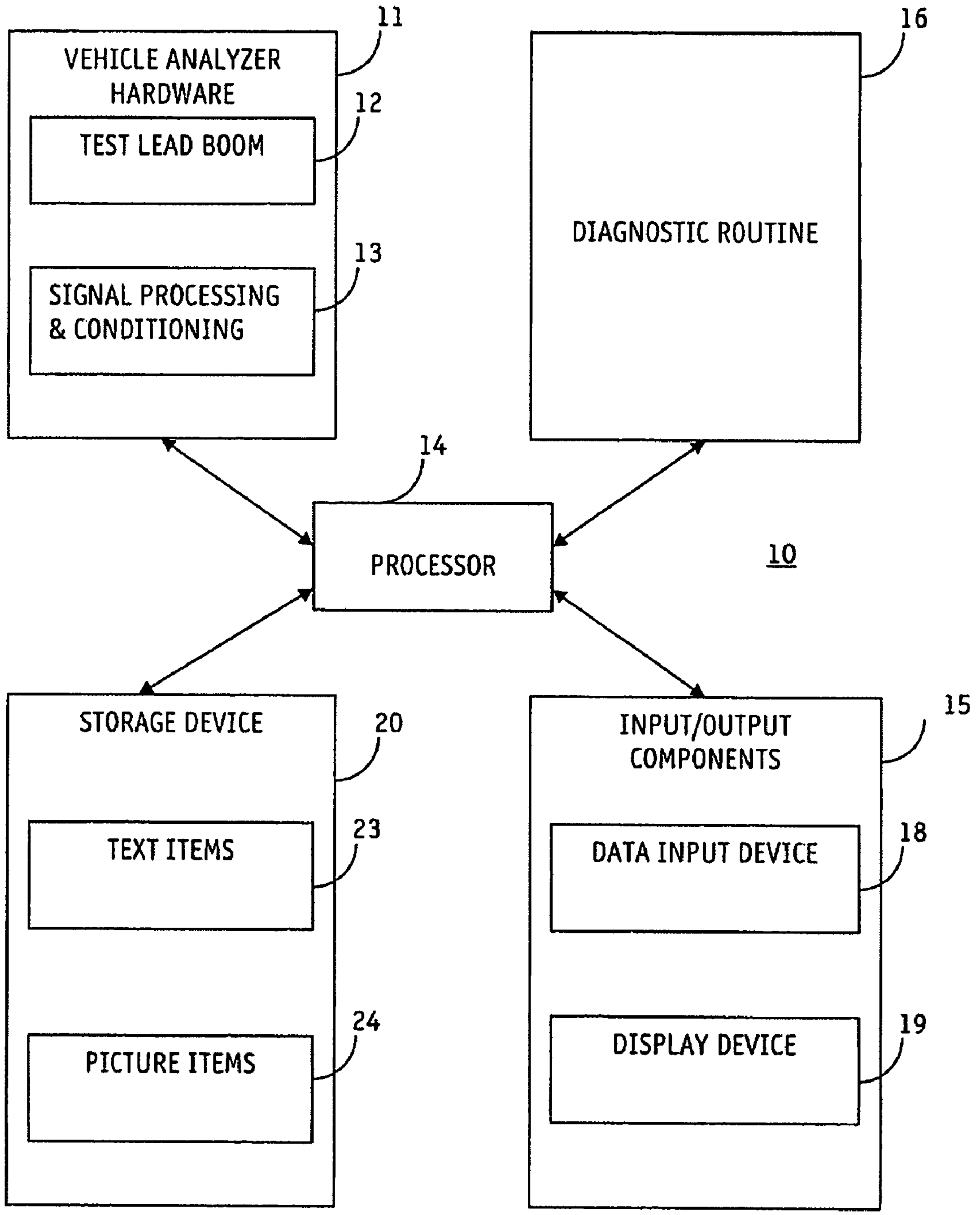
FIG. 2 is a block diagram of a diagnostic system platform that may be used in a diagnostic system as described herein.

Diagnostic systems for vehicles use platform products, data providers, and stand-alone software to run their analyses. FIG. 2 shows a block diagram illustrating the components of one embodiment of a diagnostic system platform 10. The diagnostic system platform 10 is illustrated as relating to a vehicle analyzer system, but it could be applicable to other types of vehicle or non-vehicle diagnostic systems. Preferably, but not necessarily, the diagnostic system platform 10 is a personal computer ("PC"), running a Windows-based operating system and using a system vehicle analyzer. It should be understood that the present application may be usable with several different types of vehicle analyzer systems, such as the engine analyzer system disclosed in U.S. Pat. No. 5,250,935, which is herein incorporated in its entirety by reference. As illustrated in FIG. 2, the diagnostic system platform 10 may include vehicle analyzer hardware 11, a processor 14, input/output components 15, a storage device 20, and a diagnostic routine 16. More or fewer components that those shown in FIG. 2 may be used with the diagnostic system platform 10.

The vehicle analyzer hardware 11 may include a test lead boom 12, including a plurality of test leads and sensors adapted to be connected to various points of an associated vehicle 4, and signal processing and conditioning hardware 13 for interfacing the test lead boom 12 to the processor 14.

The processor 14 may be one or more processors, such as a general-purpose processor and/or a digital signal processor. Other types of processors are also possible for use with the diagnostic systems platform 10.

The input/output components 15 are coupled to the processor 14 and facilitate a user's interaction with the diagnostic system platform 10. As such, the input/output components 15 may allow the user to select vehicle identification items, such as text items relating to faults, tests, and/or solutions, and view text and picture items. Thus, the input/output components 15 might include a data input device 18 with at least one button, dial, or key as input mechanisms, and a display device 19 as an output mechanism, for instance. Exemplary data input devices 18 for the diagnostic system platform 10 include a keyboard, a mouse, a stylus, a pointer, and/or a popup keyboard. Exemplary display devices 19 might include a monitor, screen, projector, or other types of displays. Moreover, the data input device 18 and the display device 19 may be integrated together in a handheld device, such as a PDA or cell phone. The diagnostic system platform 10 may also comprise other and/or additional or fewer input and/or output components than those shown in FIG. 2.

Also, the diagnostic system platform 10 is typically provided with a storage device 20, which may include one or more of a number of different types of data and storage devices, such as RAM, ROM, a CD-ROM drive, a floppy drive, a hard drive, a memory stick or other storage devices. The diagnostic system platform 10 may include program software (not shown), which may be resident in the storage device 20 or which may comprise a stand-alone software package stored in an external storage device. As shown in FIG. 2, the storage device 20 preferably contains both text items and picture items relating to vehicle diagnostic information.

In one embodiment of a diagnostic system replacing text with pictures, the storage device 20 is in communication with the processor 14 and contains a database of vehicle information items (see FIG. 2). Included within this database of vehicle information items are a library of text items 23 relating to faults that may be experienced by a vehicle under diagnosis, tests that may be performed on the vehicle for the purpose of diagnosing the cause of the faults, and/or a solution that may be used to correct the faults. In one embodiment, test results may also be stored on the storage device 20 and may be linked to corresponding solutions. Additionally, the database of vehicle information items may contain a library of picture items 24, which may be independent or may correspond to text items 23.

The library of picture items 24 may contain component pictures, factory procedure pictures, animations, symbols, characters, icons, sounds, colors, other graphics and/or edits thereof. Picture items 24 have a method of identification associated with them such as meta-tags, allowing picture identification and picture searching. Moreover, other picture items 24 may be downloaded to the library of picture items 24 and stored in the storage device 20.

The storage device 20 communicates with the processor 14, and the processor 14 executes a diagnostic routine 16. The diagnostic routine 16 may communicate with the vehicle 4 and diagnose faults. Additionally, the diagnostic routine 16 may that may replace at least a portion of the text items 23 with picture items 24. Moreover, the diagnostic routine 16 and processor 14 may replace a portion of picture items 24 with different picture items 24. The display device 19, which is coupled to the processor 14, may display vehicle information items after the diagnostic routine 16 is executed.

The diagnostic routine 16 may contain instructions for i) recognizing text items 23 in the storage device 20; ii) replacing text items 23 with picture items 24; iii) prompting the user to select which text items 23 they would like replaced; and/or iv) causing the display of picture items 24 with or without portions of text items 23. The diagnostic routine 16 may alternatively contain other and/or additional or fewer instructions than those mentioned herein. The diagnostic routine 16 may be implemented in hardware, or firmware, or alternatively, may be stored in the storage device 20 as computer instructions that are executable by the processor 14 (e.g., software).

One aspect of a typical diagnostic system is that it permits a fault-based diagnosis of a vehicle. In such a fault-based mode of operation, the system presents the user with a menu of problems indicated, e.g., by symptoms or service codes, and the user selects those problems which are pertinent to the vehicle under test. Based upon the selected faults, the system then presents the user with a list of tests to be performed to diagnose the cause or causes of the faults. The tests are listed in the order in which they would most likely be effective in diagnosing the vehicle faults, based upon the manufacturer's information and previous repair and diagnosis experience with the type of vehicle being analyzed.

Figure 3:
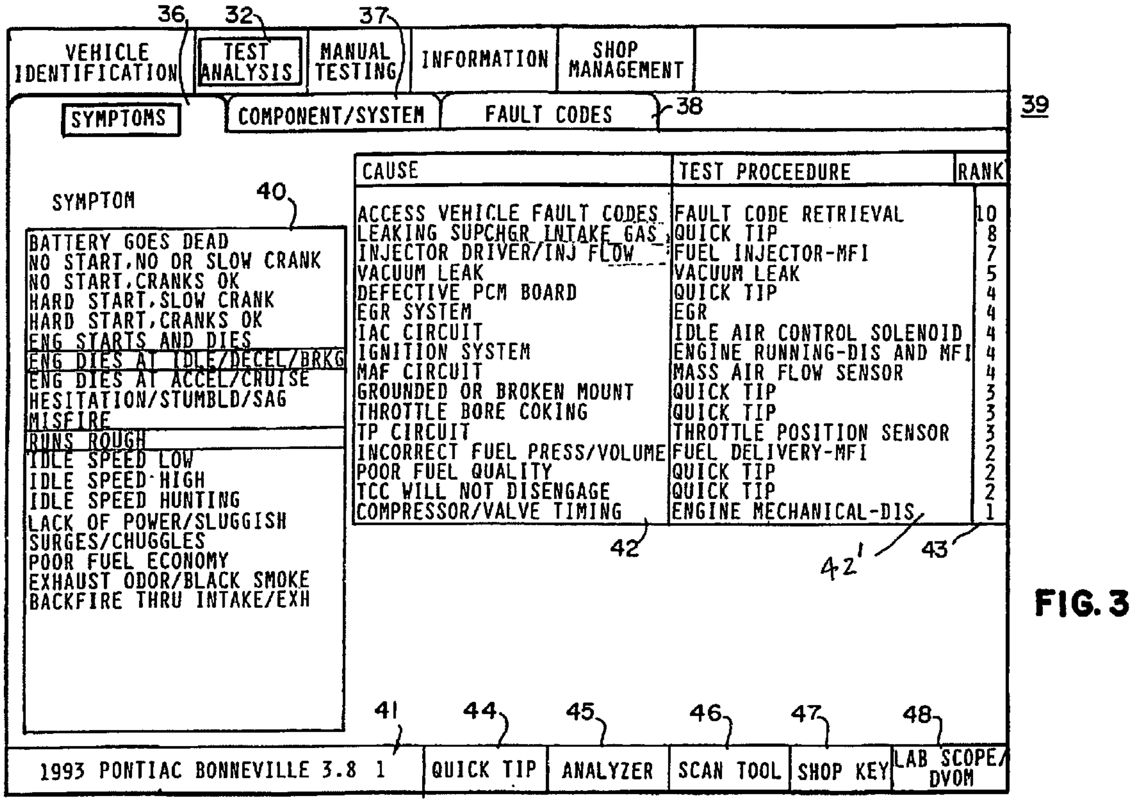
FIG. 3 is a screen page of an engine analyzer used in a diagnostic system platform.

Once the vehicle is identified, in an exemplary diagnostics system, the user could begin a typical diagnosis by selecting certain buttons or text items on a screen page. For instance, in an exemplary screen page 39, as shown in FIG. 3, a Test/Analysis button 32, presenting three different tabbed files 36–38, respectively labeled "Symptoms," "Component/System," and "Fault Codes," may be provided. The "Symptoms" and "Fault Codes" files relate to fault-based modes. If the "Symptoms" file is selected, it is displayed in the foreground in the screen display 39 of FIG. 3. The screen display 39 includes a menu 40 of symptoms that may be exhibited by the vehicle type previously selected by a user. The screen page 39 may indicate at the bottom of the screen page 39 the vehicle type that was previously selected (see reference numeral 41). The list of symptoms 40 presented to the user is representative of industry symptom diagnosis, and supports the majority of drivability complaints.

A standard list of symptoms 40 is possible because vehicles use common technology. They each have mechanical, ignition, fuel, and computer components that function in roughly the same manner. Other more specific symptoms may be assigned to one or more of the symptoms from the main symptom list. For example, a specific symptom of "Vehicle Dies When Taking a Right Turn" will fit under a less specific symptom of "Vehicle Dies at Idle/Deceleration/Braking." The tests to diagnose the condition, however, are generally the same. A standard list of symptoms is preferably used because it provides a consistent interface and diagnostic philosophy for all vehicles, and promotes technician and service writer familiarization.

The user/technician selects one or more of the listed symptoms 40 that are exhibited by a vehicle under test, as determined from an interview with the vehicle owner, for example. Based upon the symptom or symptoms selected, the screen page 39 displays a list 42, specific to the vehicle under test, of possible causes of the symptom or symptoms selected, as well as a counterpart list 42' of test procedures to be performed to check for those causes. The test procedures are listed in the order of the probability or likelihood that the test will be successful in diagnosing the cause of the selected symptom or symptoms, this ranking being shown in FIG. 3 as reference numeral 43.

Vehicle Diagnostic System Operation

Because a standard list of faults may be used to describe most possible symptoms exhibited by an apparatus or vehicle, pictures items may be used as a substitute for text items in an exemplary diagnostics screen pages, like the one shown in FIG. 3. Additionally, picture items may be updated and edited. It should be understood that picture items may be used to replace text items in a variety of different types of diagnostic screen pages, including testing and solution screen pages used by technicians.

Figure 4:
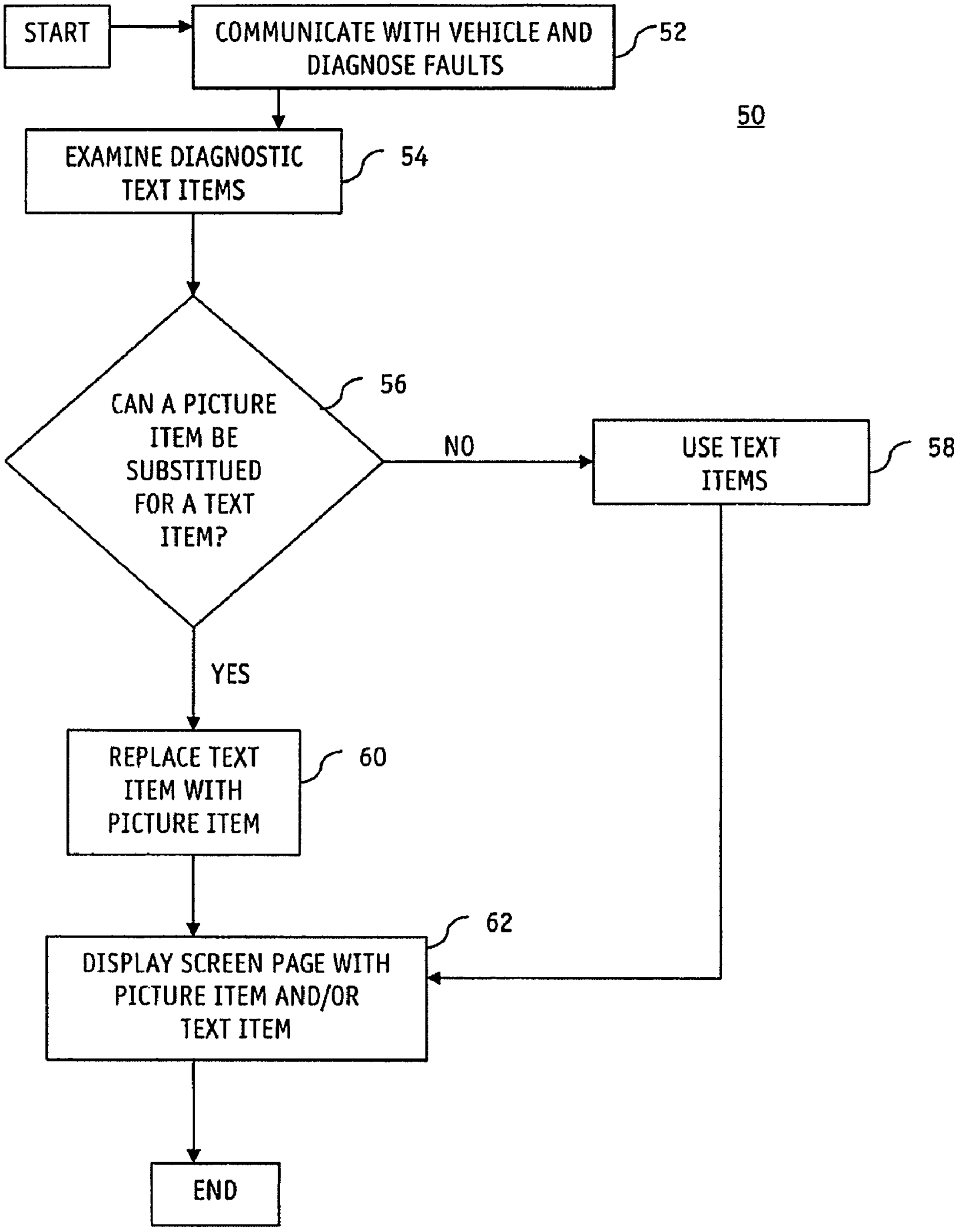
FIG. 4 is a flow diagram illustrating the steps for replacing text items with pictures items.

A method 50 for operating the diagnostic system platform 10 and replacing text items 23 with picture items 24 is shown in FIG. 4. Such replacement may take place automatically when the processor 14 executes a search and comparison routine which performs a text string versus image meta-tag comparison on the text items 23 and the picture items 24, and then automatically replaces text items 23 with their associated picture items 24; manually, in which a developer may go through each screen page 39 on the display device 19 and rewrite instructions for the display of picture items 24, with or without also displaying the text items 23; or user actuated, wherein at least a portion of the text items 23 are converted to picture items 24 at the command of the user via the data input device 18, either in its entirety or on an individual screen page 39 basis. Alternatively, rather than being totally replaced, the text items 23 may be displayed simultaneously along side the picture items 24 on the display device 19. Moreover, older picture items 24 may be replaced by different picture items 24 that have been edited for clarity. For example, based on the vehicle and component selected, a developer could replace factory procedure picture items 24 with edited picture items 24. The developer could add test points to the existing picture to show what lead to use, the best place to make a connection between the data analyzer and the vehicle, and what normal readings would be. Additionally, picture items 24 could be interactive or on the user's display device 19, i.e. when a user accesses a portion of the picture item 24, the diagnostic routine 16 and processor 14 could bring up a new screen page 39 related to the area selected by the user.

Regardless of the process employed to convert the text items 23 to picture items 24, the method 50 begins with step 52, wherein the vehicle diagnostic system 2 communicates with the vehicle 4 via vehicle analyzer hardware 11. The processor 14 and diagnostic routine 16 then diagnose faults according to the vehicle's make and model. This fault information is transferred to the vehicle's storage device 20 for later access.

In step 54, the diagnostic test items (information relating to faults, solutions, or test results) located in the storage device 20 are examined, recognized, and appreciated either by the diagnostic routine 16 executed by the processor 14, or by a developer. Next, in step 56, a determination is made as to whether a picture item 24 may be substituted for a text item 23. This may be accomplished automatically by the diagnostic routine 16 (executed by the processor 14) or by the decision of a computer programmer, developer, or user. If the diagnostic routine 16 makes this determination, it may do so by first accessing a database of picture items 24 located on the storage device 20 that correspond to text items 23 also stored on the storage device 20. If a picture item 24 exists that corresponds to a text item 23, then the picture item 24 may be substituted for a text item 23, as shown in step 60. Alternatively, a developer may download, edit, or create a new picture item 24 that that corresponds to the text item 23, which then may be substituted for the text item 23. However, if no corresponding picture item 24 exists or is created for a particular text item 23 and thus may not be substituted (or may be confusing if one is substituted), then the text item 23 should be retained, as shown in step 58.

In another embodiment, the diagnostic routine 16 may access the database of picture items 24 located on the storage device 20 that correspond to text items 23, and then may bring up corresponding picture items 24 and cause a prompt on the display device 19 for a developer or user to choose whether or not to substitute a particular picture item 24 for a text item 23. For each text item 23 to be replaced, the developer or user may choose whether or not to adopt these changes by entering a command into the data input device 18. Further, the diagnostic routine 16 may also be adapted to prompt the developer or user to adopt changes for each screen page (e.g., screen page 39) being replaced, instead of each text item 23 replaced.

In other embodiments, the diagnostic routine 16, may function to cause the display device 19 to prompt the developer or user to display both text items 23 and picture items 24 simultaneously, to toggle between text items 23 and picture items 24, to download additional picture items 24 to the storage device 20, to bring up all corresponding picture items 24 by selecting a text item 23 by entering a command into the data input device 18, or to bring up a text item 23 after selecting a picture item 24.

Once the determination of whether each text item 23 is to be replaced or maintained occurs, then a display device 19 should display the screen page (e.g., screen page 39) with the picture items 24 and/or text items 23, as shown in step 62. This concludes the method 50, which may be executed for the entire diagnostic system platform 10, including all vehicle information items, such as individual tests, solutions, information relating to faults, test results, or portions thereof.

Figure 5:
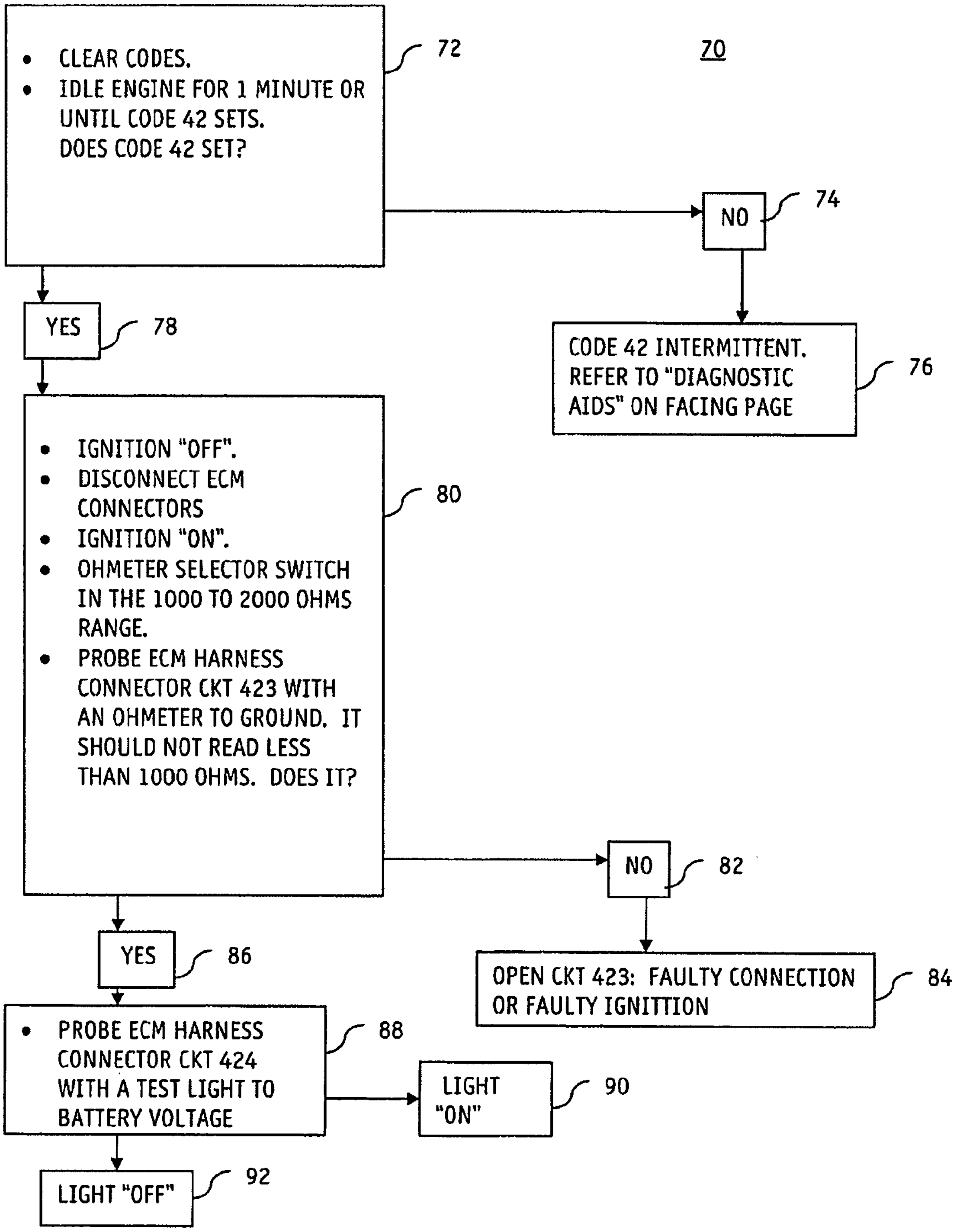
FIG. 5 is a text version of a portion of a screen page that may be used by a technician to diagnose engine problems.

One type of screen page that contains text items 23 that may be replaced with picture items 24, at least partially, is an engine diagnostics screen page. For example, FIG. 5 shows an exemplary text version of a portion of an engine diagnostics screen page 70 that may be displayed on any display device 19. Such text instructions have several components, which may be displayed for a technician to follow for diagnosing engine problems. For instance, in the idle engine box 72, the technician is instructed to idle the engine and check for a code to set. If the code does not set and a "no" box 74 applies, then the technician will be instructed what to do next by the reference manual box 76. If a "yes" box 78 is triggered instead, the check ohms box 80 is displayed, asking the technician to restart the ignition and take measurements of the voltage of the battery.

If the ohms measurement does not comply with the set standards, then another "no" box 82 applies. The "no" box 82 will then trigger the display of the fault box 84, diagnosing the problem as a faulty connection or ignition. On the other hand, if another "yes" box 86 applies instead, then battery voltage box 88 is displayed. As shown in FIG. 5, the battery voltage box 88 requires the use of a test light, which if turned on as indicated by the "on" box 90, indicates positive voltage, whereas the "off" box 92 indicates a dead battery.

Figure 6:
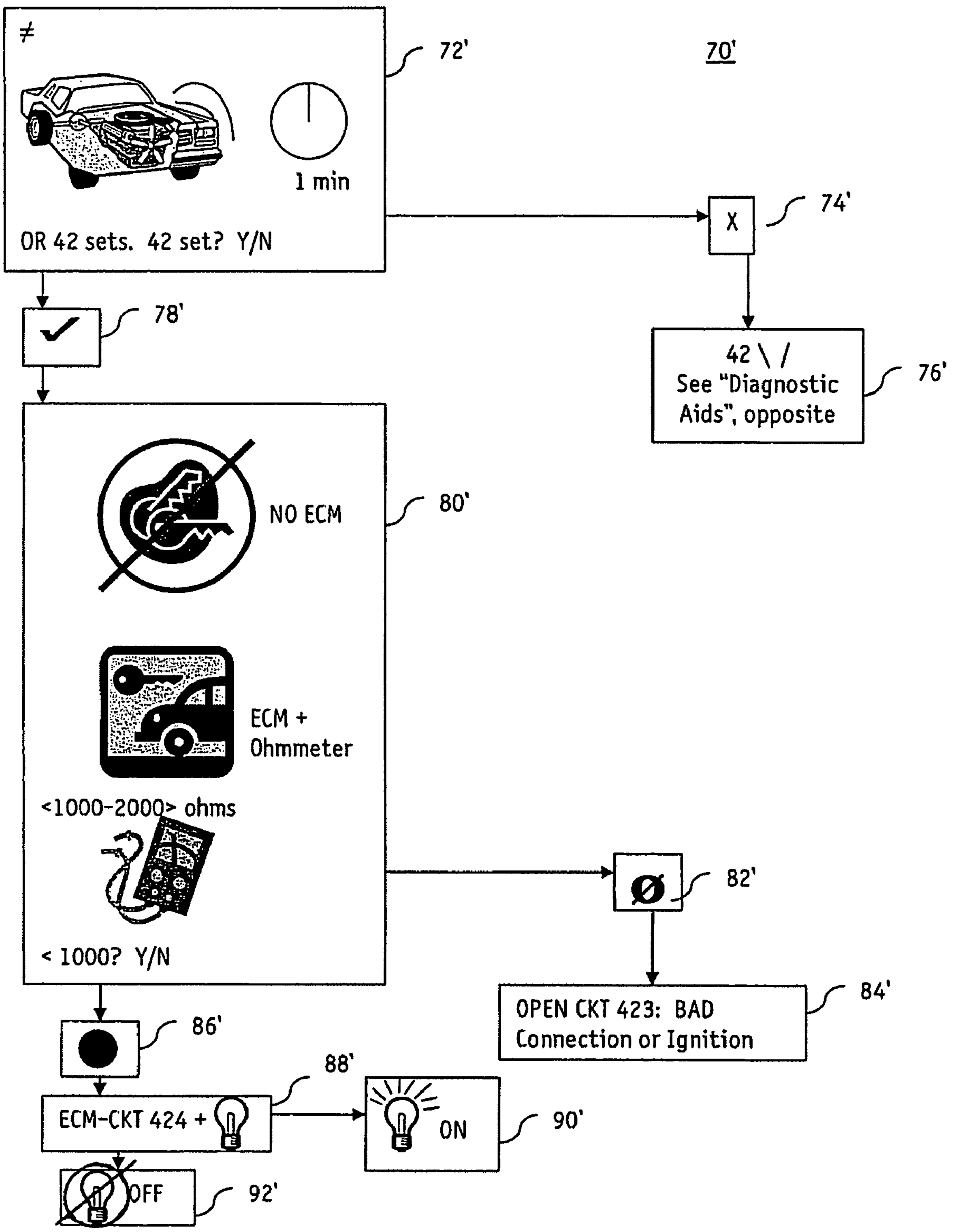
FIG. 6 is the screen page shown in FIG. 5, with picture items replacing text items.

Turning now to FIG. 6, the diagnostic system platform 10 and the method 50 of its operation may be run on the engine diagnostics screen page 70 to replace certain text items 23 with a more uniform communication, such as any combination of picture items 24. The result may be the graphical diagnostics screen page 70' shown in FIG. 6. For example, the idle engine box 72 could be replaced by a symbol indicating "clear codes" and then a picture of a car with a running clock, timed for a minute or illustrating one minute. These pictures may be animated for further ease in communicating the desired message. Additionally, if numbers or words may convey meaning with greater ease, they may be interspersed with the pictures, as show in the idle engine box 72' of FIG. 6.

In addition, the "yes" box 78 may be replaced by a uniform symbol, such as a check mark or a green light, as shown in the "yes" box 78' of FIG. 6, and the "no" box 74 may be replaced by an "X" mark or a red light, as shown in the "no" box 74' of FIG. 6. Moreover, "yes" box 86 could be replaced by an audible noise, such as a bell ring, and "no" box 82 could be replaced by a buzzer sound, either alone or in conjunction with pictures or symbols as well (like those mentioned for boxes 74', 78'). Any of these picture items 24 are interchangeable and may be used either alone or with other text items 23 at any step of the replacement.

In the case of reference manual box 76', a symbol may be used to replace "intermittent," while the text items 23 previously displayed in the reference manual box 76 may be abbreviated or modified to simplify the instructions. In the check ohms box 80', picture items 24 are shown that may be used to replace text items 23. For instance, a "not" sign displayed over keys could tell the user to turn the ignition off, whereas a key and car sign could be used to indicate the ignition should be turned on. Again, picture items 24 may be shown on each screen page (e.g., screen page 39), either alone or along with text items 23. For instance, the range of ohms to be used may be shown in conjunction with a picture of an ohmmeter. In such a case, the numbers may even be integrated into the picture being displayed, e.g., the ohm reading could be indicated on the display of the ohmmeter in a static or animated format.

For further example, the battery voltage box 88 could be replaced by a number or an easily recognizable abbreviation and a light bulb to indicate that a test light is used. To indicate the results of the test light steps, a textual display of light on box 90 could be replaced with a glowing light bulb picture, as shown in the light on box 90'. Similarly, the light off box 92 could be replaced with a dim light bulb picture or a "not" sign over the light bulb picture, as shown in the light off box 92'.

Thus, the above embodiments illustrate just a few of the many ways in which the principles of the present application can be applied. These embodiments simplify the diagnostic procedure by replacing text items with picture items, which are more readily understood throughout the world. Moreover, picture items may be edited and updated continuously. Using picture items alone or in conjunction with text items reduces the risk of incorrect interpretation and mistake due to language barriers, jargon, and regional slang. Further, since translations into multiple languages can be costly, these principles provide a more cost effective solution to dealing with the above described problems. Thus, the better solution for combating language barriers is to translate text items into picture items so that service technicians can quickly read diagnostic screen pages and quickly ascertain the message being displayed.

Moreover, in view the wide variety of ways in which the principles of the present application can be applied, it should be understood that the illustrated embodiments are exemplary only, and should not be taken as limiting the scope of the present application. Accordingly, the claims should not be read as limited to the described order or elements unless stated to that effect. Therefore, all embodiments that come within the scope and spirit of the following claims and equivalents thereto are claimed as the application.

We claim:

1. A method for diagnosing a vehicle using pictures, the method comprising:

providing text items related to diagnosing a vehicle;

examining the text items to determine whether particular text items can be replaced with picture items accessing a database of picture items corresponding to particular text items;

correlating picture items with at least a portion of the text items;

retrieving the correlated picture items;

replacing at least a portion of the text items with the correlated picture items;

displaying an image including at least one picture item; and diagnosing faults related to a vehicle.

2. The method of claim 1, further comprising:

prompting a developer to select a portion of text items to be replaced with picture items from a database.

3. The method of claim 1, further comprising:

prompting a user with a choice of displaying text items simultaneously with corresponding picture items.

4. The method of claim 1,further comprising downloading picture items to the database of picture items.

5. The method of claim 4, wherein downloading picture items further comprises storing picture items to the database of picture items.

6. The method of claim 4, wherein the database of picture items comprises animations.

7. The method of claim 4, wherein the database of picture items comprises sounds.

8. The method of claim 4, wherein the database of picture items comprises colors.

9. The method of claim 4, wherein the database of picture items comprises factory procedure pictures.

10. The method of claim 1, further comprising: prompting the user with a choice of toggling between text items and picture items.

11. The method of claim 1, wherein examining diagnostic text items further comprises:

recognizing text items with corresponding picture items;

prompting the user to choose between displaying picture items or picture items along with text items.

12. The method of claim 11, wherein the text item is a test.

13. The method of claim 11, wherein the picture item is a component picture.

14. A method for diagnosing a vehicle using pictures, the method comprising:

diagnosing faults relating to a vehicle;

providing diagnostic text items relating to a vehicle;

recognizing diagnostic text items, including identifying particular diagnostic text items for which to search for correlated picture items;

based on the identified diagnostic text items, accessing a database of picture items corresponding to diagnostic text items;

correlating picture items with at least a portion of the text items;

replacing the at least a portion of the text items with the corresponding picture items; and displaying an image including at least one picture item.

15. The method of claim 14, wherein the text items include tests.

16. The method of claim 15, wherein the text items include information relating to faults.

17. The method of claim 15, wherein the text items include solutions.

18. The method of claim 15, further comprising:

prompting on the display device an option to toggle between text items and picture items.

19. The method of claim 15, further comprising:

prompting a selection of which text items should be replaced with picture items.

20. A method for diagnosing a vehicle using pictures, the method comprising:

connecting to a vehicle;

executing a diagnostic routine for diagnosing faults relating to a vehicle;

in response to the diagnostic routine for diagnosing faults relating to a vehicle, executing a diagnostic routine for replacing text items with picture items;

providing diagnostic text items relating to faults;

accessing a database of picture items corresponding to the diagnostic text items;

correlating picture items with at least a portion of the text items;

replacing at least a portion of the diagnostic text items with the correlated picture items; and displaying an image including at least one picture item.

* * * * *